United States Patent
Hauffe et al.

[15] 3,684,242
[45] Aug. 15, 1972

[54] SOFT SEATED ROTARY VALVE

[72] Inventors: William L. Hauffe, Warrensburg; Robert R. Finney, Decatur, both of Ill.

[73] Assignee: Mueller Co., Decatur, Ill.

[22] Filed: April 28, 1970

[21] Appl. No.: 32,708

[52] U.S. Cl............................251/317, 137/625.46
[51] Int. Cl............................F16k 5/00, F16k 11/06
[58] Field of Search.......251/317; 137/625.46, 625.4

[56] References Cited

UNITED STATES PATENTS

| | | | |
|---|---|---|---|
| 870,377 | 11/1907 | Marett | 137/607 X |
| 3,538,953 | 11/1970 | Berger | 137/625.46 |
| 601,634 | 4/1898 | Cotter et al | 137/625.12 |
| 1,171,189 | 2/1916 | Grandi | 251/298 |
| 3,047,019 | 7/1962 | Simpson | 132/625.28 |
| 3,131,862 | 5/1964 | Deydier | 137/625.4 X |
| 3,195,573 | 7/1965 | Daumy | 137/625.4 |
| 3,296,026 | 1/1967 | Long | 251/317 X |
| 3,314,645 | 4/1967 | Temple | 251/317 |

FOREIGN PATENTS OR APPLICATIONS

| | | | |
|---|---|---|---|
| 1,092,090 | 11/1967 | Great Britain | 137/625.46 |

*Primary Examiner*—Samuel Scott
*Attorney*—Cushman, Darby & Cushman

[57] ABSTRACT

A rotary valve assembly is provided having a valve housing member and a rotary valve arranged therein. The valve housing is provided with an inlet and an outlet opening into a central chamber. Spaced above the central chamber is an opening for the insertion into the central chamber of a unitary structure. A cylindrical roller made of resilient material is carried by the unitary valve structure for movement within the central chamber between open and closed positions. The cylindrical roller is designed to provide a snap-in action when it is disposed either in open or closed positions. The roller will have a rotary movement about its own axis, and it will also have a bodily movement in a circular path about a central axis in the chamber. The roller has inwardly tapered or frustoconical ends whereby it will be resiliently and tightly disposed within an oblong port in the central chamber to define the closed position. A second cylindrical roller may also be provided on the unitary valve structure, diametrically opposed from and of identical or substantially identical construction to the first cylindrical roller whereby the two rollers will be designed simultaneously to be closed to seal both the inlet and the outlet into the central chamber. Grooves or blind seats are provided in the central chamber for the reception of the rollers to indicate the open position.

9 Claims, 8 Drawing Figures

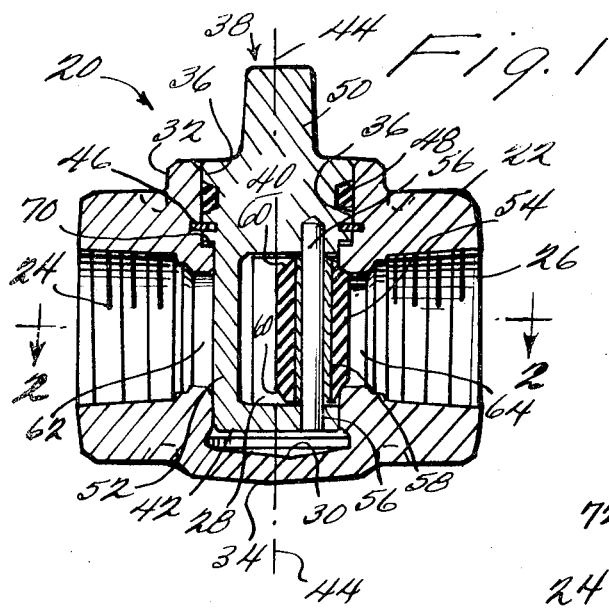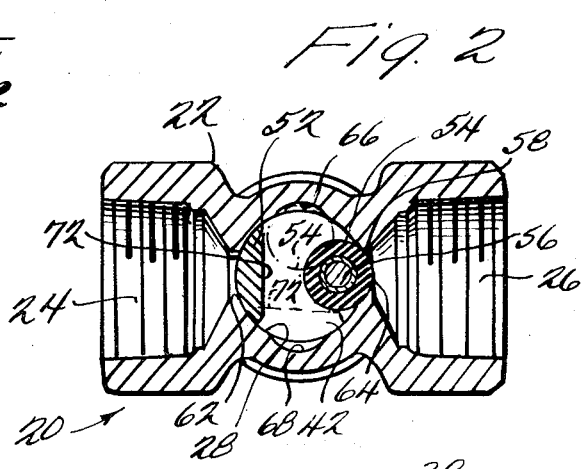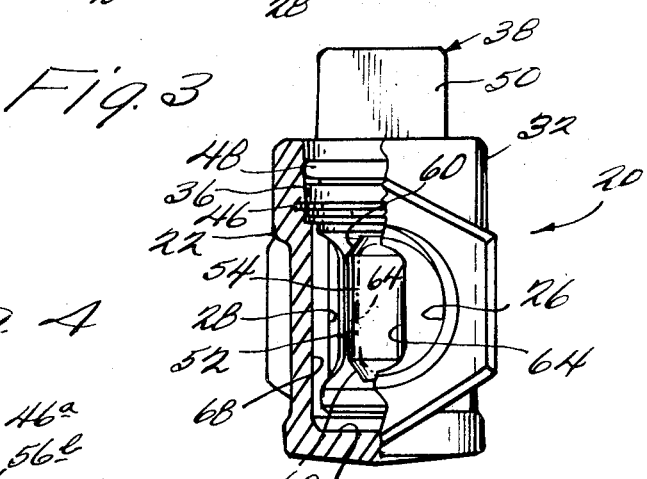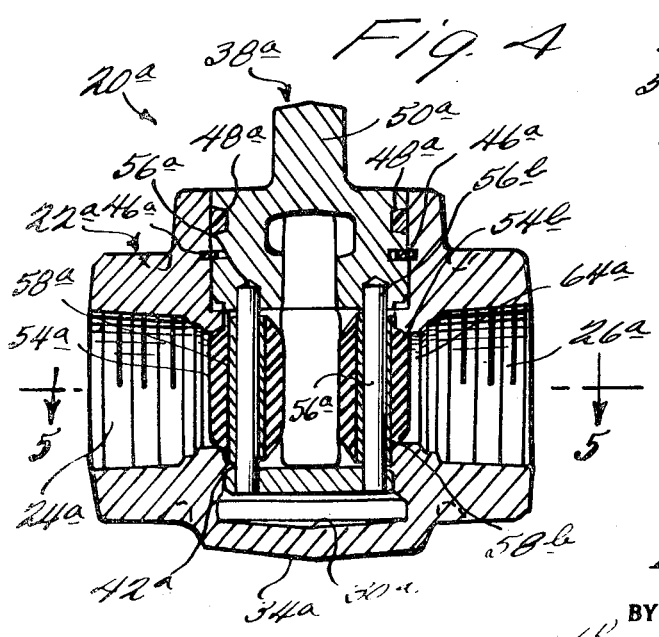

INVENTORS
WILLIAM L. HAUFFE
ROBERT R. FINNEY

BY
Cushman, Darby & Cushman
ATTORNEYS

SOFT SEATED ROTARY VALVE

BACKGROUND AND OBJECTS

The present invention relates to rotary valves and in particular to rotary valves of the type having a housing with a flow passage therethrough and a unitary rotary valve member arranged in the housing and rotatable between open and closed positions. Valve assemblies of the type contemplated in the present invention are commonly used in supply lines for domestic gas, for example, being connected into the line ahead of the gas meter, sometimes exteriorly of the dwelling, and buried in the ground in a curb box or the like. These valves are commonly referred to as stops. It will be appreciated, however, that the invention is applicable to valves adapted for other uses and for other fluids.

A primary objective of the present invention is to provide a novel and improved valve construction, of the type under consideration, especially designed to minimize friction between the moving parts whereby the valve may be conveniently and easily turned between open and closed positions irrespective of the length of time the valve may previously have been in either position. A related object is to design such a valve construction with a cylindrical roller made of a resilient sealing material acting as the valve element and adapted to be tightly and securely engaged in its closed position to provide a more effective seal or closure of the flow passage through the valve housing.

A further object of the present invention resides in the provision of novel designs, in valves of the type referred to, realizing the objectives noted above and also providing a simplified construction facilitating the assembly of the valve in the housing. A related object is to provide a unitary valve structure carrying a cylindrical roller as the flow passageway closing or sealing element and designed to be conveniently assembled in the valve housing. It is also contemplated that the valve structure, when so assembled in the valve housing, will be substantially tamper-proof and unremovable without breaking or destroying structure of the valve assembly.

A still further object of the invention is to provide a rotary valve construction, of the type referred to above, designed with novel means to provide a perceptible snap action when the valve is moved to open or closed positions.

Other objects of the present invention reside in the provision of a novel valve assembly, of the type referred to, of simplified, inexpensive and durable construction, providing superior performance characteristics lasting over long and indefinite periods of times.

In one of the illustrative embodiments of the invention, a valve housing is provided having a bore therethrough opened at one end to the exterior of the housing and closed at the other end. A fluid chamber is provided intermediate the ends of the bore and in communication with inlet and outlet ports formed in the housing. A unitary valve structure is fitted in the bore with a valve element carried thereby being disposed in the fluid chamber. The valve element is in the form of a cylindrical roller made of resilient material, and the unitary valve structure is adapted to be rotated about the axis of the bore. The axis of the cylindrical roller is spaced from and parallel to the axis of the bore whereby upon rotation of the unitary valve structure, the roller may be moved into or out of sealing engagement with either the inlet or outlet ports. The design is such that there will be a snapping-in indication given whenever the cylindrical roller is engaged in its closed position. A groove is also formed in the fluid chamber of the bore, spaced from the inlet and outlet ports, for the reception of the roller when the valve is in its open position. The cylindrical roller will also provide a snapping-in indication when it becomes disposed in the groove. The open end of the bore is designed to provide a seat for the unitary valve structure. Suitable means will be provided for retaining the valve structure in the housing and for sealing the flow passage from the exterior. Such means may take the form of a tamper-proof split ring disposed in cooperating and aligned grooves in the valve structure and the bore of the valve housing and a sealing ring may be provided in the valve structure in engagement with the valve seat in the manner disclosed in the commonly owned co-pending application of William L. Hauffe, entitled "Tamper-Proof Rotary Valve Assembly," Ser. No. 883,125 filed on Dec. 8, 1969, now U.S. Pat. No. 3,563,512.

The unitary valve structure is shown in the form of a key member carrying the valve element or cylindrical roller and it includes an external structure such as a flattened, non-circular boss for engagement with a suitable tool to manipulate the valve, as will be understood.

In other exemplary embodiments of the invention, a second cylindrical roller is carried by the unitary valve structure, in diametrically opposed relation to and of identical or substantially identical construction to the first roller, so that these valve elements will both be disposed in the inlet and outlet ports at the same time, when the valve is closed. Likewise, a second groove is formed in the side wall of the fluid chamber for the reception of the second roller when the valve is in open position. The rollers are spaced apart a sufficient distance so as not to impede flow through the flow passage when the valve is open.

The foregoing and other objects and advantages of the invention will appear from the following description of the preferred embodiments illustrated in the accompanying drawings, wherein:

FIG. 1 is a vertical sectional view through a valve assembly embodying the invention;

FIG. 2 is a sectional view taken along line 2—2 of FIG. 1 and with valve elements thereof also shown in phantom lines to indicate the open position;

FIG. 3 is an end elevational view of the valve assembly shown in FIG. 1 and partially cut away for illustrative purposes;

FIG. 4 is a vertical sectional view corresponding to FIG. 1 and showing another embodiment of the valve assembly of the invention;

DETAILED DESCRIPTION OF THE ILLUSTRATIVE EMBODIMENTS OF THE INVENTION

Figure 5:
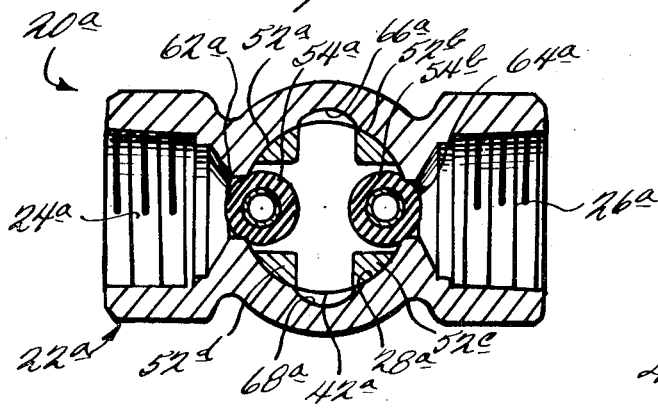
FIG. 5 is a sectional view taken along the line 5—5 of FIG. 4.

Referring now to the drawings, like or similar reference numerals designate like or similar parts in the illustrated exemplary embodiments of the invention. In the embodiment of FIGS. 1–3, there is shown a rotary valve assembly generally designated by the numeral 20 and having a valve housing 22 provided with a flow passage therethrough. The valve housing 22 may be formed of any suitable material, such as a metal casting. One end of the flow passage therethrough defines an inlet end portion 24 for the valve assembly, while the other end of the flow passage in the housing defines an outlet portion 26. Each of the inlet 24 and outlet 26 portions may be suitably threaded, as indicated, for receiving the threaded ends of fluid lines (not shown). It will be appreciated that means other than threaded connections may be utilized for securing the fluid lines to the valve housing 22. The flow passage is shown as including a generally circularly cylindrical central chamber 28 provided by a vertical bore extending downwardly through the top of the housing 22 and terminating in a blind hole 30 at the bottom of the housing. The valve housing 22 is provided with a generally cylindrical annular open extension 32 at its upper end, and a closed projection or protuberance 34 is formed in the housing below this extension 32 to define the outer and inner portions of the vertical bore. A key seat 36 is shown provided within the extension 32 at the top of the bore and a key member 38 is arranged within the bore, as shown, with an upper portion 40 fitted against the key seat 36 and having a lower portion 42 disposed in the blind hole 30, as shown.

The key member 38 will be rotatable about its own axis 44 within the valve housing 22, and it is shown as being held against axial movement and sealed by structure such as that disclosed in the commonly owned co-pending application of Hauffe, identified above. This structure is shown as including a locking split snap ring 46 engaged in aligned annular recesses formed respectively in the upper portion 40 of the key member 38 and the key seat 36, as shown in FIGS. 1 and 3. It also includes an O-ring seal 48 arranged within an annular or peripheral recess in the upper portion 40 of the key member 38 and resiliently, sealingly engaged to the key seat 36.

The key member 38 is shown as including a flattened rectangular boss or projection 50 for engagement by a suitable tool whereby the key member may be externally manipulated to open or close the valve, as will be understood. In this connection, suitable means in the form of a layer or film of lubricating or like material may be provided on the surface of the key seat 36 and/or on the external surface of the upper portion 40 of the key member 38 to facilitate rotation thereof, as disclosed in the aforesaid Hauffe application. As will be appreciated, in certain installations, such as in underground gas lines for domestic and industrial uses, valves of the present invention will be disposed underground (with axis 44 vertical or horizontal or otherwise suitably disposed). The key member 38 may be in a valve open position for indefinite periods of time. Thus, it is important to have means such as the aforesaid lubricating layer or film between the key seat 36 and the key member so that the valve will not stick in any one position or otherwise be difficult to manipulate when that is desired.

The key seat 36, while shown as being generally circularly cylindrical, may be formed so as to slightly taper downwardly and inwardly, with the external surface of the upper portion 40 of the key member 38 complementarily shaped so as to facilitate insertion and retention of the key member in proper position.

The key member 38 is shown as including a web 52 integrally joining the upper 40 and lower 42 portions thereof. According to the invention, a cylindrical roller valve element 54 is carried by the key member 38 between the upper 40 and lower 42 portions thereof. As shown, a pin 56 is fixedly mounted in the key member 38 with the cylindrical roller 54 thereon. A suitable sleeve-like bearing or bushing 58 is carried by the pin 56, as shown, to facilitate rotation of the roller about the axis of the pin. The roller 54 is shown in diametrically opposed relation to the web 52, and it includes inwardly tapering or frusto-conical top and bottom portions 60. The roller 54 is made of a suitable resilient sealing material, such as rubber, neoprene, or a suitable plastic.

Ports 62, 64 defining valve seats are provided opening into the central chamber 28 from the inlet 24 and outlet 26 respectively, and these ports therefore constitute an inlet and an outlet to the central valve chamber. These ports are shown as being of the same size and shape, arranged in diametrically opposed relation. The shape thereof is best seen in FIG. 3 as being oblong with the long dimension shown in the vertical direction. The size, shape and mounting of the cylindrical roller 54 is such that it will fit snugly and tightly within either of these ports, as shown. Thus, the distances between the tapered portions 60 of the roller and the long dimension of the oblong ports 62, 64 are so designed that in the closed position, the top and bottom curved ends of the port 64 (or 62) fit the tapered portions 60 of the roller 54 near the ends of the roller allowing or forcing the roller to deform or extrude or bulge into the port 64, as indicated in FIGS. 1 and 3, producing an effective seal or closure of the passageway through the valve.

The width of the roller 54 is greater than the width or short dimension of the oblong ports 62, 64, as best seen in FIG. 2. And, the disposition of the pin 56 in the key member 38 is such that there will be a snap-in indication when the roller 54 is firmly and resiliently seated in either of the ports 62, 64. This not only will provide a perceptible and sure indication to the operator that the valve is properly in its closed position but it will also guarantee an effective and tight seal or closure of the flow passage, as indicated.

As best seen in FIG. 2, the central chamber 28 is provided with diametrically opposed grooves 66, 68 constituting blind seats for the roller 54 when the valve is open. Thus, when turning the key or valve member 38 from the position thereof shown in solid lines in FIG. 2, the roller 54 will be slightly compressed as it rolls along the generally cylindrical surface of the central chamber 28 whereby when the roller 54 reaches one of the grooves 66, 68 it will snap into that groove to relieve the load thereon. This provides a perceptible and sure indication to the operator that the valve is in fully opened position. It also assures that the valve will be held or located in that position until further manipulation of the key or valve member 38 takes place. It will be appreciated that suitable external markings (not shown) may be provided on the valve housing 22 and on the visible top surface of upper portion 40 of the key member 38 to visually indicate whether the valve is open or closed. Note that phantom lines in FIG. 2 indicate a position of the roller 54 when the valve is open.

The web 52 is shown in FIG. 2 as including an external surface of circularly cylindrical conformation designed to slide across the cylindrical side walls of the central chamber 28 when the valve member is turned. Additionally, the web 52 and pin 56 are so positioned on the key member 38, and the thickness of the roller 54 is so designed that when the valve is in closed position the web 52 preferably will be disposed over the inlet port 62 while the roller 54 will be firmly disposed in and compressed by the outlet port 64, as indicated. Thus, if any fluid pressure tends to leak through the inlet 62 past the web 52 and into the chamber 28 it will act on the resilient roller 54 to effect a further compression thereof against the outlet port 64 thereby making the seal even more effective.

It will be appreciated that with the design just described, a highly efficient and effective valve action is provided. The valve element itself, namely, the roller 54 should perform satisfactorily over indefinite periods of time, providing superior results. External manipulation of the key member 38 will effect a rolling of element 54 between open and closed positions whereby friction, wear and tear will be minimized as will be evident.

It will also be appreciated that the bottom portion 42 of the key member 38 may be formed as a separate member suitably attached, as by welding or the like, to the web 52. And a shoulder 70 may be provided at the inner end of the key seat 36, as shown in FIG. 1.

It will be seen that the key or valve member 38 carrying the roller valve element 54 thereon is designed for convenient and easy insertion into the bore and chamber 28 of the valve housing 22 in connection with the assembling of these valves. The key member 38 may be inserted into the bore with the roller 54 aligned with one of the grooves 66, 68 and with the O-ring 48 and split ring 46 carried thereby. When the split ring 46 reaches the groove in the key seat 36 it will snap thereinto, as disclosed in the aforesaid copending Hauffe application, indicating that the valve member 38 is in its proper axial position in the valve housing. The valve assembly 20 is now ready for installation in a gas or water line or any suitable fluid conveying system, as will be understood.

As shown, the space between the roller 54 and the web 52 is sufficient to provide for streamlined and uninterrupted flow of fluid through the housing 22 when the valve is open. In this connection, the web 52 is provided with a flattened or planar inside surface 72 that preferably will be disposed outside of the flow path (defined by the aligned inlet 62 and outlet 64 ports) when the valve member 38 is in the fully open position thereof indicated in phantom lines in FIG. 2.

Figure 6:
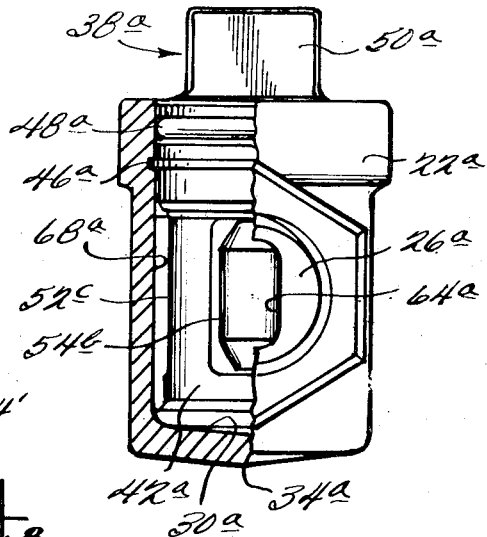
FIG. 6 is an end elevational view of the valve shown in FIG. 4 and partially cut away for illustrative purposes.

The embodiment illustrated in FIGS. 4-6 will be seen to be similar to the embodiment of FIGS. 1-3 except that the key member 38a is shown as carrying a second pin 56a, bushing 58a and roller 54a structure diametrically opposed to the first roller 54b. Thus, the valve housing 22a is identical or substantially identical to the valve housing 22 shown in FIG. 1. The key member 38a of the FIGS. 4-6 embodiment is also shown as including four webs 52a, b, c, d arranged in pairs on opposite sides of the rollers 54a, b. These webs will provide a passageway therethrough when the valve is in its fully opened position with the rollers 54a, b in the grooves 66a, 68a. In other words, the webs will not interfere with or put any obstacle in the flow path between the inlet 62a and outlet 64a when the valve is opened.

Thus, it will be seen that the valve assembly of the FIGS. 4-6 embodiment provides all of the principal advantages of the FIGS. 1-3 embodiment.

Figure 7:
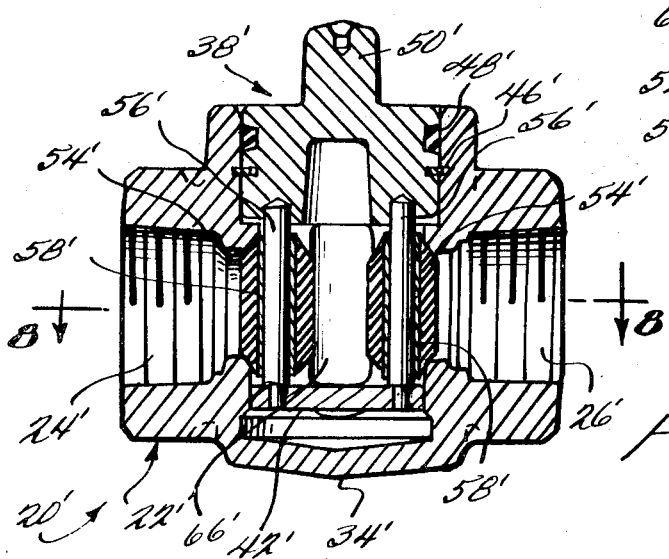
FIG. 7 is a vertical sectional view corresponding to FIG. 1 and showing a still further embodiment of the valve assembly of the invention.
Figure 8:
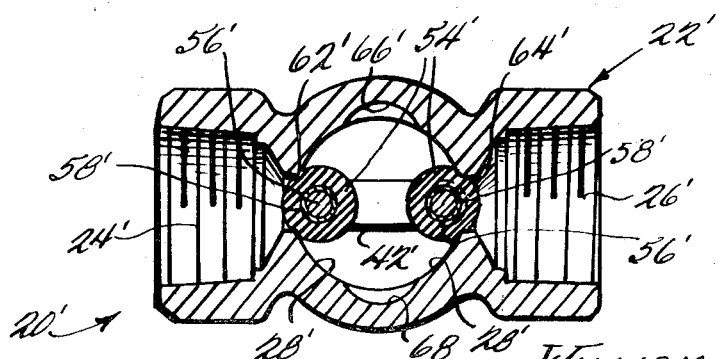
FIG. 8 is a sectional view taken along the line 8—8 of FIG. 7.

FIGS. 7 and 8 illustrate an embodiment corresponding to that shown in FIGS. 4-6 except that the bottom portion 42' of the key member 38' is a separate piece, not integral with the upper portion 40' of the key member. This bottom portion 42' is secured to the upper portion 40' of the key member through the pins 56' for the rollers 54'. Thus, in this embodiment, no webs are provided depending from the upper portion 40' of the key member.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims:

What is claimed is:

1. A rotary valve assembly comprising: a valve housing having a flow passage therethrough and with means defining an inlet and an outlet for said flow passage, said flow passage including a chamber open to said inlet and said outlet, a rotary valve actuating means including a valve member disposed in said chamber, said actuating means being rotatable about a first axis to selectively open or close fluid communication between said inlet and said outlet through said chamber, at least one of said inlet and said outlet being formed with an oblong port therein opening into said chamber, said oblong port having a major axis and a minor axis and ends at the major axis being curved, said valve member including a cylindrical roller made of a resilient sealing material and having its own axis of rotation spaced from and parallel to said first axis, said roller having frusto-conical ends spaced apart a distance wherein the frusto-conical ends are in coextensive sealing engagement with said curved ends of said oblong port to close communication between said inlet and said outlet, said roller being under a partial load when in coextensive sealing engagement with said port and under a greater load when said port is open whereby there is a snap when moving said roller between open and closed positions.

2. The structure defined in claim 1 wherein said chamber is defined by generally circularly cylindrical side walls with said port constituting an opening therein, and an elongated groove formed in said side walls parallel to said first axis defining a blind seat, said blind seat being spaced from said port and of a width adapted to receive said roller without a substantial load thereon, and rotation of said actuating means about said first axis being adapted to move said roller between a first compressed position in engagement with said port and closing the valve assembly and a second position in said seat and opening the valve assembly whereby a snapping-in indication will be given when said roller is properly in either of these positions.

3. The structure defined in claim 2 wherein the other of said inlet and said outlet is formed with a port corresponding in size and shape to said firstnamed port, a second valve member carried by said actuating means and including a cylindrical roller made of a resilient, sealing material and similar to said firstnamed roller but spaced therefrom to provide a passageway therebetween, the second-named roller being movable into snap-sealing position in the second-named port, and a second elongated groove formed in the side walls of said chamber defining a second blind seat for snap-reception of said second roller.

4. The structure defined in claim 3 wherein said first and second rollers and said first and second seats and said first and second ports are all in diametrically opposed relation.

5. A rotary valve assembly comprising:
a valve housing having a central chamber therein and an inlet and an outlet opening into said chamber and defining a flow passage therewith, said housing also having a key seat with an opening at one end to the exterior of the housing and an opening at the other end into said central chamber, a key member rotatably seated on said key seat for rotation about a first axis extending through said central chamber, said central chamber being defined by generally circularly cylindrical side walls with two openings formed therein to communicate said chamber respectively with said inlet and said outlet, at least one of said openings defining an oblong port, said oblong port having a major axis and a minor axis and ends at the major axis being curved, a blind seat formed in said side walls of said chamber between said openings and extending in a direction parallel to said first axis, a valve member carried by said key member and disposed in said chamber, said valve member including a cylindrical roller of resilient material and having its own axis of rotation spaced from and parallel to said first axis, said cylindrical roller having frusto-conical ends spaced apart a distance wherein the frusto-conical ends are in co-extensive sealing engagement with the curved ends of said oblong port when the valve is closed and said roller having a diameter between said ends greater than the minor axis of said port, said roller being arranged to roll in said chamber between said blind seat and said port when said key member is rotated, and said roller, said port and said blind seat being designed so that the roller will snap into said port under partial load and said blind seat under substantially no load to indicate respectively when the valve is closed or opened.

6. The structure defined in claim 5 wherein a second roller is carried by said key member in diametrically opposed relation to the first-named roller, said rollers being spaced from each other to define a passageway therebetween, the other of said openings also defining an oblong port diametrically opposed from said first named port, a second blind seat formed in said chamber side walls diametrically opposed to said first-named blind seat and said rollers being adapted to close said ports in one position of said key member and to be disposed in said blind seats in another position of said key member.

7. A rotary valve assembly comprising:
a valve housing having a central chamber and an inlet port and an outlet port in communication therewith; said central chamber including a generally cylindrical side wall portion adjacent one of said ports; said side wall portion having an elongated groove defining a blind seat formed therein and spaced from said one port, said seat and said one port extending in axial directions relative to said generally cylindrical side wall portion; a roller valve having a resilient cylindrical surface thereon arranged in said chamber for rotation about its own axis and adapted to engage in said blind seat and said one port, said elongated groove having a greater length than the overall length of the cylindrical surface of said roller, valve actuating means operatively engaged to said roller valve and mounting said roller valve with the roller axis parallel to the axis of said side wall portion, said valve actuating means being rotatable about the axis of revolution for said generally cylindrical side wall portion for moving said roller valve along said side wall portion between said blind seat and said one port, and said roller valve, said one port and said blind seat being so designed that there will be a perceptible snap action when said roller valve engages either in said blind seat or said one port denoting respectively open and closed fluid communication between said ports through said central chamber.

8. A valve assembly comprising: a housing having a bore open at one end and closed at its inner end and including a cylindrical fluid chamber, said housing including a fluid inlet port and a fluid outlet port in communication with said chamber to define a flow passage therewith, a unitary valve structure adapted to be rotatable in said bore on the axis of the same, said valve structure including a cylindrical roller having at least a resilient surface, said roller having an axis spaced from and parallel to the axis of said bore, said inlet port and said outlet port each being defined by an oblong port of substantially the same size and each opening into said chamber, and said roller including inwardly tapering ends spaced from each other a distance approximately equal to the long dimension of said ports, and said ports and said roller all being disposed to provide for coextensive alignment of said roller in either of said ports when said valve is closed, and an elongated groove in said chamber parallel to the axis of said bore, said valve structure with said roller being designed to be bodily inserted into said bore with said roller being received in said groove, and rotation of said valve structure when received in said bore being effective to move said roller from said groove under compression to a position in sealing engagement in one of said inlet or said outlet ports to close said flow passage.

9. The structure defined in claim 8 wherein a seat is provided in said bore for rotatably seating a portion of said unitary valve structure externally of said chamber and at said open end of said bore, said seat and said portion of said unitary valve structure including means for snap-locking said valve structure in its assembled position in said housing and for pressure and fluid sealing said chamber and said flow passage from the exterior of said housing.

* * * * *